…

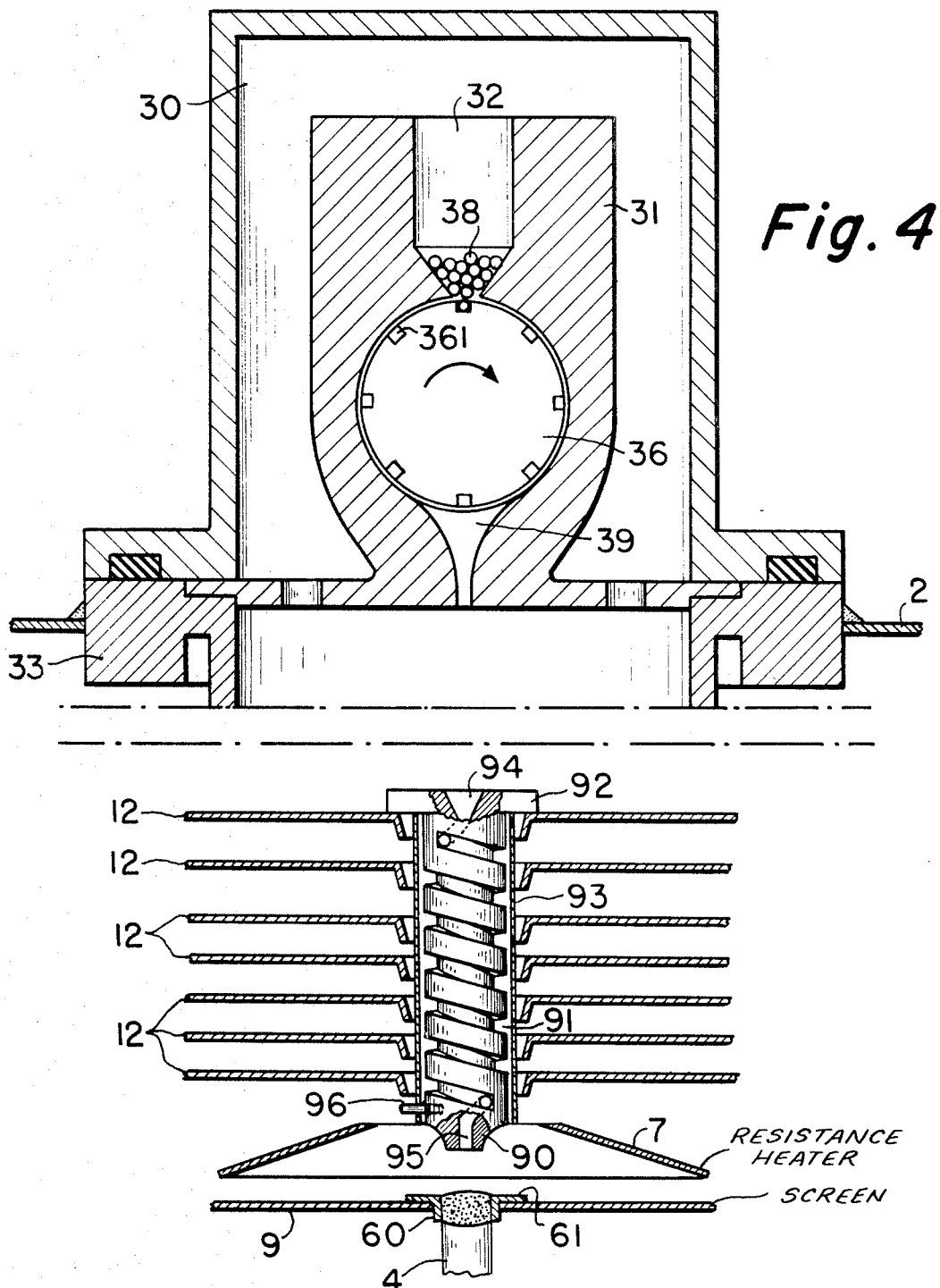

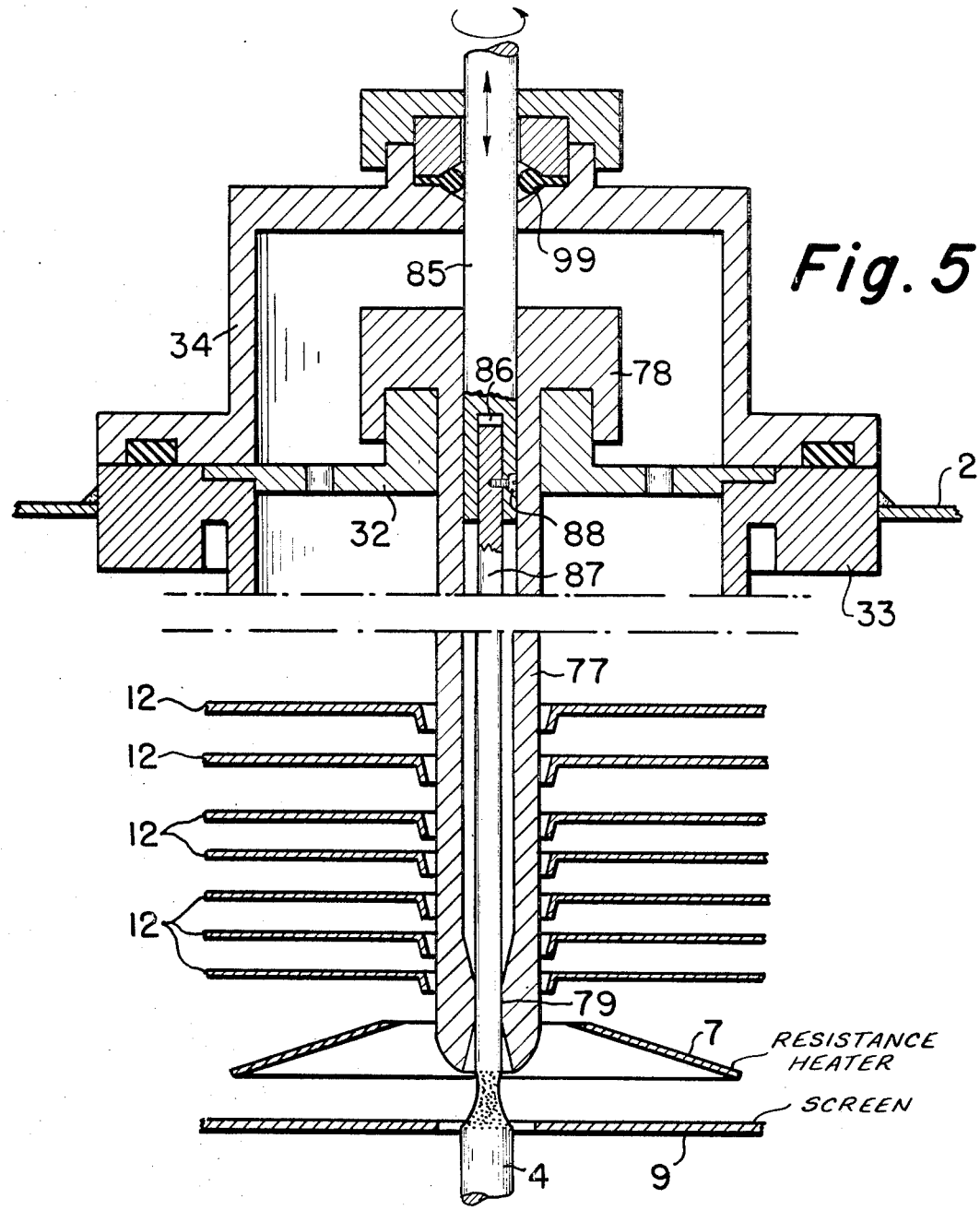

United States Patent Office 3,519,394
Patented July 7, 1970

3,519,394
APPARATUS FOR THE FABRICATION OF A SYNTHETIC RUBY
Georges Petit-le Du, Palaiseau, and Jack Aubrée, Sartrouville, France, assignors to Ugine Kuhlmann, Paris, France, a corporation of France
Continuation-in-part of application Ser. No. 525,974, Feb. 8, 1966. This application Jan. 9, 1967, Ser. No. 615,287
Claims priority, application France, Feb. 10, 1965, 5,078; Jan. 11, 1966, 45,551
Int. Cl. B01j 17/24
U.S. Cl. 23—273                                    6 Claims

ABSTRACT OF THE DISCLOSURE

The fabrication of a synthetic monocrystal in an inert atmosphere containing less than 5 parts per million oxygen and water in a furnace having a fusion chamber and a cooling chamber connected by an opening through which a seed crystal rotatably mounted in the cooling chamber extends by feeding preheated addition material vertically to a fused superficial layer of a seed crystal, the seed crystal being rotated and translated vertically at such a speed that the preheated addition material does not cool the fusion layer below its melting point.

---

This application is a continuation-in-part of our copending application, Ser. No. 525,974, filed Feb. 8, 1966, now abandoned.

This invention relates to fabrication of artificial rubies which are suitable for the formation of lasers.

It is known that the energetic output of a ruby laser can be high only if the monocrystal which forms its resonant cavity is very pure, homogeneous and substantially faultless. The usual process for the fabrication of a synthetic ruby, known as Verneuil method, consists in feeding a ruby seed crystal, superficially fused with the flame of an oxyhydrogen blowpipe, with a pulverulent mixture of alumina and chromium oxide and introducing the mixture to the ruby through this flame. However, the Verneuil method does not assure obtention of rubies suitable for lasers with good reproductiveness because the crystals obtained have a great number of defects in structure, purity and homogeneity.

The requirement for operating under a controlled atmosphere led to a flameless fusion method which consists in replacing the Verneuil blowpipe flame by the image of an electric arc disposed inside a fluid tight furnace. This method is described in a paper of F. A. Halden and R. Sedlacek entitled "Verneuil Crystal Growth in the Arc-Image Furnace" and published by the American Review "The Review of Scientific Instruments," vol. 34, No. 6 of June 1963, pages 622 to 626. According to this paper, an arc heat is focused by a set of mirrors on the end of the seed crystal and the addition materials are prepared in the form of powder grains of 10 to 75 microns in diameter. The seed crystal is impelled with a rotary movement to equalize temperatures and a translation movement to keep its end within the focal zone of the mirrors whereby it is maintained at a temperature near its melting point by auxiliary heating means to permit its slow and uniform cooling down towards the end of the operation. Replacement of the electric arc carbons worn out during the operation presents difficult problems and the heat concentration mirrors are often polluted by a deposit of vaporized or finely divided addition materials thereby limiting the heating in their focal zone and jeopardizing destruction by superheating of the crystal support. Thus, the production is not continuous enough to grow faultless rubies to the necessary size for lasers.

This invention improves the fabrication of synthetic rubies by the flameless fusion method and obtains faultless rubies of the desired size for lasers.

The process of the invention comprises carrying out the production of the synthetic ruby under an inert atmosphere—for instance argon—in a resistance furnace divided into two superposed chambers of different adjustable temperatures by a partition provided with an orifice through which a crystal on formation can pass longitudinally. The first chamber is a superficial fusion chamber into which the end of said crystal enters through the orifice, and the second one is a controlled cooling chamber which contains the remainder of said crystal and its moving support. The addition material used for crystal growth may be either ruby or an agglomerate mixture of alumina and sintered chromium oxide and may be formed either as spherules or as a cylindrical rod.

If the addition material is in the form of spherules they should be about 1 mm. in diameter and are deposited, after a prior heating, one by one at a regulated rate upon the fused superficial layer of the end of the seed crystal.

The spherules should be distributed one by one upon the fused end of the crystal at a rate which, in combination with preheating the spherules, permits them to be combined with the seed crystal without provoking any solidification of the fused superficial layer. Preferably the delivery of the spherules is by gravity from a distributor which so regulates their introduction to the seed crystal that local solidification of the fused superficial layer is avoided.

If the addition material is in the form of a cylindrical rod, the rod is held vertically in the resistance furnace and aligned above the seed crystal. The rod is maintained at a distance from the crystal sufficient to permit the ends of the rod and crystal to join by a molten ruby penduncle in capillary equilibrium. The use of the cylindrical rod not only avoids local solidification but prevents molten ruby from running out along the periphery of the growing crystal.

The apparatus for fabrication of synthetic rubies which constitutes a part of our invention comprises a furnace having a fusion chamber and a cooling chamber. Mounting means in the cooling chamber holds the end of a seed crystal in an opening between the fusion chamber and the cooling chamber. The mounting means can be rotated and moved vertically. Means for feeding addition material to the furnace either in the form of spherules or as a cylindrical rod is positioned above the fusion chamber vertically above the opening between the fusion chamber and the cooling chamber in which the seed crystal is mounted.

Our invention will be more fully understood by reference to the drawings in which we have shown the present preferred embodiments of the apparatus of our invention in which rubies suitable for lasers may be fabricated according to the process of our invention.

FIGS. 3, 4 and 5 are section views showing alternative means for feeding addition materials to the furnace and preheating those addition materials.

Figure 1:
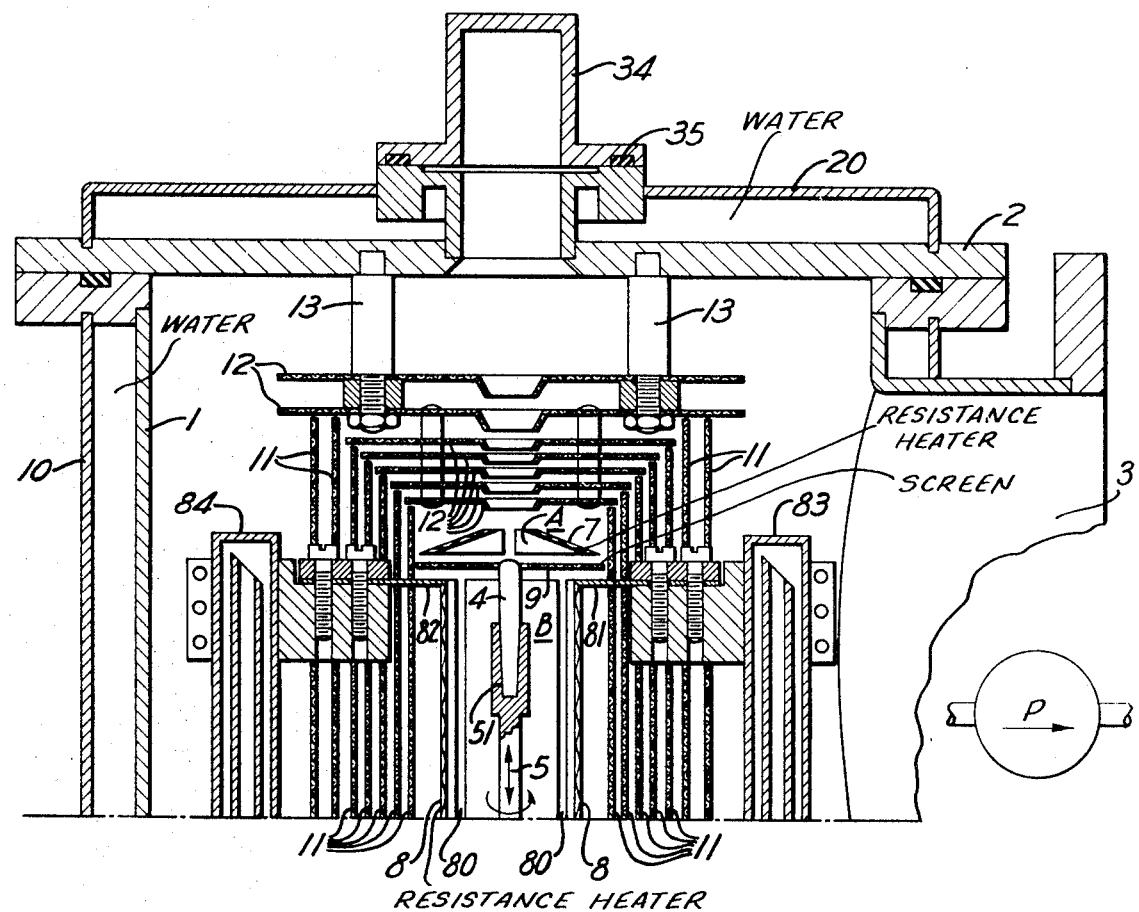
FIGS. 1 and 2 are fragmentary section and plan views, respectively, of the apparatus but do not include the means for feeding addition materials to the furnace.

FIG. 1 shows a section of an upper part of a heating resistance furnace fitted for the manufacture of a synthetic ruby. This furnace is located inside a vertical cylindrical vacuum enclosure 1, closed at both ends by plates of which only the upper plate 2 is represented, and connected through an orifice 3 of large diameter to a pumping device shown schematically which generates a vacuum of 10⁻⁶ mm. Hg. The vacuum enclosure 1 and its terminal plates are double-walled with water circulating between both walls 1 and 10 and 2 and 20 to obtain a substantial cooling ability.

In the axis of vacuum enclosure 1, a ruby crystal 4 is centered in a conic bedding 51 which forms the upper end of a vertical molybdenum rod 5 whose diameter is small as possible to avoid heat losses. The lower end of the rod is connected to a mounting (not shown) which is actuated by motors (not shown) for rotation and vertical translation of both it and the crystal. The movement is indicated by arrows in FIG. 1.

Figure 2:
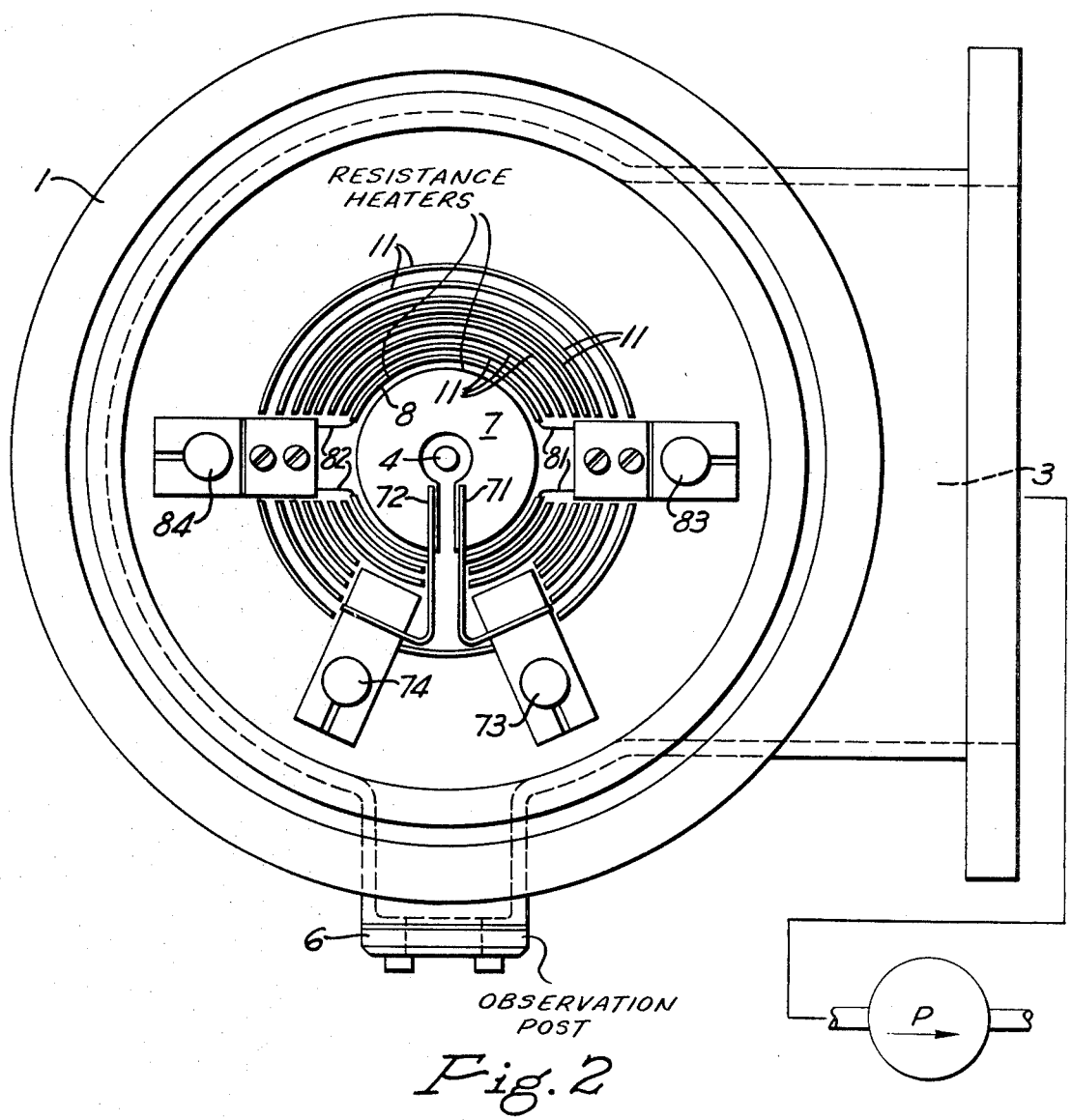

As shown in FIG. 2, the double wall of the vacuum enclosure has a port-hole 6 closed by a quartz plate whereon a magnifier glass is fixed to aid in observing the crystal end, its feeding and its growth.

In the central part of the enclosure 1, and coaxially disposed are heating resistances 7 and 8 which are separated from each other by a screen 9 which defines a superficial fusion chamber A and a cooling chamber B. The heating resistance 7 is a thin tungsten or tantolum flat frustrum band with a vertical axis, which is radially cut by two vertical planes parallel to the axis of port-hole 6. This resistance 7 is connected to a source of power by conduits 71 and 72 between which is a gap to observe the end of crystal 4 through the glass associated with the port-hole 6. Conduits 71 and 72 are bonded to hollow conductors 73 and 74 which are cooled by internal water circulation and mounted by the lower plate of enclosure 1. The heating resistance 8 is a cylindrical tantalum sheet castellated by saw-cuts 80 according to its generatrixes and disposed coaxially to the heating resistance 7 below the screen 9. It is connected to a source of power by radial connections 81 and 82 through vertical hollow conductors 83 and 84 which have internal cooling water circulation and are fixed to the lower plate of enclosure 1.

To avoid a heat loss by radiation, cylindrical screens 11 surround the fusion and controlled cooling chambers. These screens are concentric of the two chambers and the outer ones are made of Inconel, for example, the intermediate ones of molybdenum and the inner ones, closest to the chambers, of tantalum. Through these screens are necessary channels for clear observation through the port-hole 6 and for passage of the connections to the heating resistances 7 and 8. Each of these screens 11 is completed by horizontal screens placed at its ends. Screens 12 placed at the upper part of screens 11 are fixed at the upper plate 2 by cross bars 13 and they are provided in their center with a circular hole for the passage of the feeding device for the crystal 4.

The temperature control in the fusion and controlled cooling chambers is effected by tungsten and tungsten-Rhenium thermocouples, placed near the heating elements.

Figure 3:
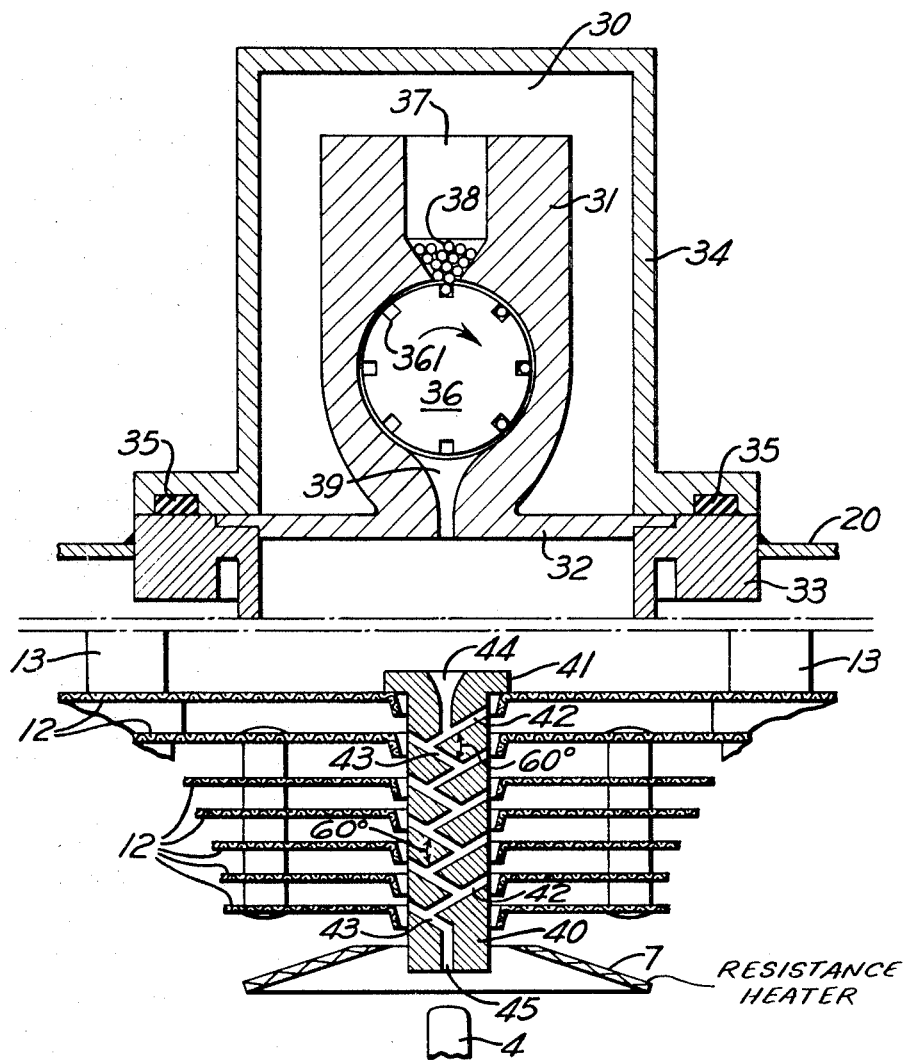

FIG. 3 represents a central section view of a spherule distributor 30 and a preheating device 40. The distributor 30 comprises a body 31 of bright stainless steel with its upper part cylindrical and its base 32 forming a plate engaged at its edges in a bedding provided for this purpose in a stand 33 fixed upon the upper plate 2 of encluosure 1. This plate 32 is maintained on a stand 33 by a metallic bell 34; a toric joint 35 ensures tightness between the stand 33 and the bell 34.

The body 31 includes in its median part a cylindrical bedding with polished chrome-plate walls in which is placed a cylindrical rotor 36 which may also be chromeplated and polished and have a diameter about 1 mm. less than that of the bedding. The rotor 36 is integral with a shaft of an electric motor (not shown) which ensures its central location in its bedding.

Cylindrical sockets 361 extend inwardly from and are uniformly spaced apart around the periphery of the rotor 36 with the opening of each and the depth of each slightly greater than the diameter of ruby spherules 38.

In the upper part of the rotor 36 the bedding includes a funnel 37 hewn from the mass of the body 32 of the distributor and containing the ruby spherules 38. As soon as a socket 361 of rotor 36 arrives in front of the opening of the funnel 37, a spherule 38 falls into it. This spherule is then entrained by the rotor 36 until the socket 361 passes in front of a channel 39 placed at the bottom of the body 31 so that the rotor 36 and bedding communicate with the furnace enclosure 1. The axis of the channel 39 is in alignment with the body 31 and is placed as a prolongation of the axis of the preheating device 40.

The preheating device 40 is a cylindrical body of tantalum which extends through holes made for that purpose in the horizontal screens 12 and provided in its upper part with a round flange 41 in engagement with the uppermost of these screens. The lower end of the preheating device 40 enters the superficial fusion zone to a short distance from the position which is occupied by the end of the crystal 4.

The preheating device includes cylindrical channels 42 and 43 which are regularly spaced and alternately form a 30° angle with the horizontal plane on one side and on the other. These channels 42 and 43 interconnect and extend into one another. An axially placed mouth 44 opens into the first channel 42 and the last inclined channel runs into an axial outlet channel 45.

When a spherule exits from the distributor through channel 39, it falls directly into the funnel 44 of the preheating device 40, follows a broken line or labyrinth path formed by segments of the channels 42 and 43 which intersect at 60° angles and travel through hotter and hotter areas in its descent. Finally, it falls through channel 45 onto the fused end of the ruby crystal 4 with the temperature of the spherule being high enough to prevent the superficial layer of the seed crystal from cooling below its melting point.

FIG. 4 shows an alternative means for preheating addition materials in the form of spherules. In this embodiment distributor 30 is placed above the preheating device formed by cylinder 90 passing through the horizontal screens 12. Cylinder 90 also passes through a central orifice in heating resistance 7 that limits the upper portion of the superficial fusion chamber.

The preheating cylinder 90, formed of molybdenum, for example, has a round flange 92 at its upper part in engagement with the uppermost of screens 12. Below flange 92, the periphery of cylinder 90 is hollowed with square sectioned helicoidal channel 91 of a width slightly greater than the diameter of a spherule 38. A sheath 93, a tantalum casting, for example, surrounding the entire length occupied by channel 91 is secured to cylinder 90 by bolt pin 96. An axially placed mouth 94 opens into helicoidal channel 91 that runs into the lower end of cylinder 90 through axial outlet 95. The dimensions of cylinder 90 and the pitch of the helicoidal channel are functions of the temperature distribution between mouth 94 and outlet 95, such that spherules reach the superficial chamber at the optimum temperature.

The central hole of screen 9, through which growing crystal 4 appears, is calibrated by a rhenium ring 60 having flange 61 in engagement with screen 9. When the speed of the vertical translation of crystal 4 is properly regulated, the fused end of the ruby remains inside ring 60 and the crystal is formed according to the caliber of the ring. The crystal is capable of sliding and turning within ring 60 with only a light friction against said motion.

FIG. 5 shows another alternative means for feeding addition material and specifically means for feeding addition materials in the form of a cylindrical rod 87 of ruby or sintered mixture of alumina and chromium oxide and preheating it. Rod 87 is supported by a molybdenum shaft 85 having a cylindrical bedding 86 at its lower end. Rod 87 is secured to the shaft in the bedding by molybdenum screw 88.

The portion of shaft 85 outside the furnace is connected to a driving mechanism (not shown) for importing vertical translation and rotational movement necessardy to the satisfactory formation of the crystal. The section of the shaft within the furnace supporting rod 87 enters the furnace through a tight joint 99. The shaft is within pipe 77, formed from molybdenum, for example, having a flange 78 set in collar 32 integral with upper plate 2 of the furnace by a stand 33 and a metallic bell 34.

The lower end of pipe 77 comprises an inner channel 79 of a reduced section for precision guidance of rod 87 in alignment with the axis of crystal 4. The pipe enters the superficial fusion chamber through holes provided in screens 12 and the central orifice of heating resistance 7.

The different phase of synthetic ruby fabrication, according to the invention process is described hereafter.

(1) FIRST DEGASSING OF THE ENCLOSURE 1

The distributor of ruby spherules or support of cylindrical rod is filled and a vacuum of $5.10^{-6}$ mm. of mercury is formed in the enclosure 1. Simultaneously, both heating elements 7 and 8 are brought to 2000° C. for two hours.

The the furnace is slowly cooled down, while the vacuum is maintained.

(2) INTRODUCTION OF RUBY SEED CRYSTAL 4

The seed crystal 4 is placed in the bedding 51 of the rod 5 with its exact centering controlled by rotating the rod about its central vertical axis.

Then the rod 5 is raised vertically so that the upper end of the crystal 4 is about 1 mm. above the plane of screen 9 which separates the fusion chamber from the controlled cooling chamber.

(3) SECOND DEGASSING OF ENCLOSURE 1

For this degrassing a $10^{-6}$ mm. of mercury vacuum is formed in the enclosure and both heating elements 7 and 8 are brought to 1000° C.

As soon as the desired vacuum is obtained, the electric current circulating in elements 7 and 8 is cut off and the furnace is allowed to cool.

(4) INTRODUCTION OF ARGON

Argon is introduced into the enclosure 1 only after a purification which clears it of traces of dampness. The inert gas filling the enclosure 1 must contain less than 5 parts of per million of oxygen and water. This condition is imperative to avoid not only pollution of the crystal, but also deterioration of all the furnace elements which are heated to high temperatures.

The argon is introduced into the enclosure 1 until the pressure reached 850 mm. of mercury. Then a circulation of about 2 litres per minute is maintained.

(5) FABRICATION OF CRYSTAL 4

The motor for rotation of the crystal is started, and both heating elements 7 and 8 are progressively brought to a high temperature until the inside of the controlled cooling chamber reaches 1950° C.

The temperature of the fusion chamber is then progressively increased until, around 2050° C., the superficial fusion of the end of crystal 4 occurs.

The operation is observed through a spyglass at the port-hole 6.

A few degrees before the fusion, the portion of crystal 4 which is in the fusion chamber becomes very bright, and its salient angles sink. As the fusion progresses, the crystal 4 is manually raised till its upper end is 2 mm. above the screen 9.

Progressively, the upper part of the crystal 4 becomes like a spherical cap. When this cap is clearly delimited, without any trace of flowing, vertical translation is begun. A rotation speed of 10 revolutions per minute may be used with a vertical descending translation of 12 mm. per hour for a crystal of a 6 mm. caliber. Smiultaneously, the spherule distributor is put into operation and the temperature of the fusion chamber is increased to about 2100° C., to balance the cooling of the fusing crystal produced by addition of the spherules and avoid such a cooling as might cause a partial solidification of the end of ruby 4 which would result in the dislocation of the crystalline structure.

The spherules must fall one by one onto the crystal center and the translation speed of the rod 5 is regulated according to the distribution rate of the spherules.

When feeding addition materials by means of a cylindrical rod, the rod is brought to within a distance from the crystal sufficient to permit the ends of the rod and crystal to join by a molten penduncle in capillary equilibrium. The rod, which may be of 3 mm. caliber, is rotated to palliate the imperfections in the revolution symmetry of the temperature inside the fusion chamber. The rotation may be in the same direction as that of crystal 4, but preferably at a different speed or in the opposite direction, for example, at 2.5 revolutions per minute. Associated with the rotation of the rod, there is imparted a vertical descending translation movement having a speed related to the descending speed of crystal and by a constant ratio dependent upon the respective calibers of the rod and crystal and the nature of the rod. Upon observing the reel-like striction of the molten mass of ruby, in capillary equilibrium between the ends of rod 87 and crystal 4, it is possible to regulate the relative speeds of the motors controlling the rotation and translation of crystal 4 and rod 87.

When the fabrication of the crystal 4 is completed, the current circulating in heating elements 7 and 8 is slowly reduced until the crystal is cooled down to room temperature.

Although the invention has been described in an example relating to the fabrication of synthetic rubies because of particular interest in large size faultless ruby monocrystals for lasers, it is obvious that the process and the apparatus have utility for distributing and preheating the addition material to the production of any other monocrystal.

While we have shown and described a preferred embodiment of our invention, it may be otherwise embodied within the scope of the appended claims.

We claim:

1. An apparatus for the fabrication of a synthetic monocrystal of a material from a seed crystal, the invention comprising an air tight enclosure containing an inert atmosphere, and including:
   (A) a fusion chamber;
   (B) a cooling chamber;
   (C) resistance heating means for heating the fusion chamber;
   (D) means independently controllable for heating the cooling chamber;
   (E) at least one screen separating the two chambers and having an opening therethrough of sufficient size to permit passage of a monocrystal in formation;
   (F) a mounting for monocrystal formation positioned in the cooling chamber;
   (G) means for rotating said mounting;
   (H) means for vertical translation of the mounting whereby a portion of the seed crystal may be positioned within the fusion chamber and as the monocrystal grows it is withdrawn from the fusion chamber into the cooling chamber so that only the upper portion of the monocrystal is maintained in the fusion chamber, and
   (I) means for feeding addition material of the same composition as said monocrystal onto a portion of the monocrystal in the fusion chamber, said means for feeding addition material including a shaft having means for securing one end of a cylindrical rod of said addition material thereto with the other end spaced from the monocrystal, means for imparting vertical translatory motion to said shaft and said rod, and means for rotating said shaft and said rod, whereby said rod is rotated at a distance from said rotating monocrystal so that the ends of said monocrystal and said rod form a molten penduncle in capillary equilibrium.

2. An apparatus for the fabrication of a synthetic monocrystal of a material from a seed crystal, the invention comprising an air-tight enclosure containing an inert atmosphere, and including:
(A) a fusion chamber;
(B) a cooling chamber;
(C) resistance heating means for heating the fusion chamber;
(D) means independently controllable for heating the cooling chamber;
(E) at least one screen separating the two chambers and having an opening therethrough of sufficient size to permit passage of the monocrystal in formation;
(F) a mounting for monocrystal formation positioned in a cooling chamber;
(G) means for rotating the mounting;
(H) means for the vertical translation of the mounting whereby a portion of the seed crystal may be positioned within the fusion chamber and as the monocrystal grows it is withdrawn from the fusion chamber into the cooling chamber so that only the upper portion of the monocrystal is maintained in the fusion chamber; and
(I) means for feeding addition material of the same composition as said monocrystal onto a portion of the monocrystal in the fusion chamber, said means including a rotor with spaced apart receptacles open at its periphery, said receptacles being of a size such that each holds solely a single spherule shaped addition material, said rotor being disposed upon rotation to deposit a spherule positioned in one of said receptacles onto a channel that leads to said seed crystal.

3. The invention of claim 2 wherein said means for feeding addition material includes means for preheating said material during travel along said channel to said seed crystal.

4. The invention of claim 2 wherein said channel consists of a plurality of downwardly sloping and interconnecting passageways that lead to said seed crystal and through which said spherules travel to said seed crystal.

5. The invention of claim 4 wherein said passageways form a labyrinth path and are positioned at substantially 30° to a horizontal plane.

6. The invention claimed in claim 2 wherein said channel consists of a helicoidal passageway sloping downwardly to said seed crystal and through which said spherules travel to said seed crystal.

References Cited

UNITED STATES PATENTS

| | | | |
|---|---|---|---|
| 1,653,022 | 12/1927 | Schmidt. | |
| 2,525,261 | 10/1950 | Henderson | 221—266 |
| 2,879,189 | 3/1959 | Shockley. | |
| 3,086,850 | 4/1963 | Marino et al. | |
| 3,173,765 | 3/1965 | Gobat et al. | |
| 3,154,384 | 10/1964 | Jones. | |
| 3,337,303 | 8/1967 | Lorenzini. | |
| 3,342,559 | 9/1967 | Dermatis. | |
| 2,690,062 | 9/1954 | Burdick | 23—273 |
| 2,697,308 | 12/1954 | Dauncey | 23—273 |
| 2,792,287 | 5/1957 | Moore | 23—273 |
| 2,965,456 | 12/1960 | Clark | 23—273 |
| 2,999,737 | 9/1961 | Sieberty | 23—273 |
| 3,077,384 | 2/1963 | Enk | 23—301 |

FOREIGN PATENTS 1,188,042    3/1965    Germany.

NORMAN YUDKOFF, Primary Examiner

U.S. Cl. X.R.

23—301; 221—266